US010666691B2

(12) United States Patent
Richards et al.

(10) Patent No.: US 10,666,691 B2
(45) Date of Patent: May 26, 2020

(54) DYNAMIC SESSION CLASSIFICATION

(71) Applicant: Avaya Inc., Santa Clara, CA (US)

(72) Inventors: Douglas Richards, Cranberra (AU);
Joel Ezell, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 714 days.

(21) Appl. No.: 15/092,914

(22) Filed: Apr. 7, 2016

(65) Prior Publication Data
US 2017/0295208 A1 Oct. 12, 2017

(51) Int. Cl.
G06F 15/16 (2006.01)
H04L 29/06 (2006.01)
H04L 29/08 (2006.01)

(52) U.S. Cl.
CPC ...... *H04L 65/1069* (2013.01); *H04L 65/1006* (2013.01); *H04L 65/1076* (2013.01); *H04L 67/00* (2013.01); *H04L 67/14* (2013.01)

(58) Field of Classification Search
CPC ............. H04L 65/1069; H04L 65/1006; H04L 67/1076; H04L 65/00; H04L 67/14
USPC ........................................................ 709/220
See application file for complete search history.

(56) References Cited

U.S. PATENT DOCUMENTS

| 6,330,479 | B1* | 12/2001 | Stauffer | A61N 5/02 607/101 |
|---|---|---|---|---|
| 8,156,536 | B2 | 4/2012 | Polk | |
| 8,539,234 | B2 | 9/2013 | O'Connor et al. | |
| 9,263,898 | B1* | 2/2016 | Ghazarian | H02J 7/0021 |
| 9,749,296 | B1* | 8/2017 | Kaushik | H04L 63/029 |
| 10,187,678 | B2* | 1/2019 | McCarty | H04N 21/235 |
| 2004/0024879 | A1* | 2/2004 | Dingman | H04L 29/06027 709/227 |
| 2005/0204148 | A1 | 9/2005 | Mayo et al. | |
| 2006/0078096 | A1* | 4/2006 | Poyhonen | H04L 29/06027 379/88.12 |
| 2006/0268839 | A1* | 11/2006 | Kato | H04L 29/06027 370/352 |

(Continued)

OTHER PUBLICATIONS

Jennings et al., "SIP: Session Initiation Protocol," RFC: 3261, Networking working group, 2002, 188 pages.*

(Continued)

*Primary Examiner* — Thanh T Nguyen
(74) *Attorney, Agent, or Firm* — Sheridan Ross P.C.

(57) ABSTRACT

A request to establish a communication session between the first communication endpoint and a second communication endpoint is received. For example, the request may be a Session Initiation Protocol (SIP) INVITE message to establish a voice communication session. A security classification for the communication session is determined. For example, the determined security classification may be that the call is top secret or unclassified. The security classification is not based on whether the communication session is solely encrypted. The security classification is inserted into the request to establish the communication session. The request to establish the communication session with the security classification is sent to the second communication endpoint. This allows the second endpoint to display the security classification. A similar process is used in a response to the request to establish the communication session to convey the security classification to the first communication endpoint.

20 Claims, 6 Drawing Sheets

(56) References Cited

U.S. PATENT DOCUMENTS

| | | | |
|---|---|---|---|
| 2007/0096894 A1* | 5/2007 | Lemmon | G08B 25/14 340/506 |
| 2007/0124813 A1* | 5/2007 | Ormazabal | H04L 29/06027 726/11 |
| 2010/0063988 A1* | 3/2010 | Khalid | H04L 45/50 709/202 |
| 2010/0150136 A1* | 6/2010 | Houle | G06F 8/65 370/352 |
| 2010/0313023 A1* | 12/2010 | Ren | H04L 63/061 713/169 |
| 2012/0220307 A1* | 8/2012 | Wohlert | H04L 67/24 455/456.1 |
| 2012/0226815 A1* | 9/2012 | Goodman | H04L 65/80 709/228 |
| 2014/0096198 A1 | 4/2014 | Brunson et al. | |
| 2016/0087488 A1* | 3/2016 | Ghazarian | H02J 9/061 307/19 |
| 2016/0227361 A1* | 8/2016 | Booth | H04W 4/029 |
| 2017/0187753 A1* | 6/2017 | Brisebois | H04L 63/20 |
| 2018/0349752 A1* | 12/2018 | Tatineni | G06K 19/07722 |
| 2019/0069154 A1* | 2/2019 | Booth | G06F 1/3231 |

OTHER PUBLICATIONS

Rosenberg et al., "SIP: Session Initiation Protocol," RFC: 3261, Network Working Group, 2002, 188 pages.

Jennings et al., "Private Extensions to the Session Initiation Protocol (SIP) for Asserted Identity within Trusted Networks," RFC: 3325, Network Working Group, 2002, 13 pages.

* cited by examiner

DYNAMIC SESSION CLASSIFICATION

BACKGROUND

Government organizations can have multiple security classifications, such as unclassified, protected, secret, etc. The security classifications are used to classify what type of information is permissible to be exchanged in a communication session. Existing solutions are limited to email. For example, a user can designate an email as unclassified, protected, or secret. This works well for email because the security classification for a sent email remains relatively static. Once an email is sent using a Protected or Secret designation, all emails associated with the original email will keep the same classification or be escalated to a higher classification.

However, for other types of communications, the email solution does not work. For example, for real-time communications, such as voice or video communications, a security classification may change as a call progresses. A voice call may be transferred from one party to a different party and then a conference call may be established with a third party. When these types of events occur, it is often difficult for the parties of in the call to determine the current security classification. For example, the call may be initially on a secure network and then be transferred to a party that is communicating from an unsecure network, resulting in a change in the security classification that is not conveyed to the parties of the call.

SUMMARY

These and other needs are addressed by the various embodiments and configurations of the present disclosure. A request to establish a communication session between the first communication endpoint and a second communication endpoint is received. For example, the request may be a Session Initiation Protocol (SIP) INVITE message to establish a voice communication session. A security classification for the communication session is determined. For example, the determined security classification may be that the call is top secret or unclassified. The security classification is not based on whether the communication session is solely encrypted. The security classification is inserted into the request to establish the communication session. The request to establish the communication session with the security classification is sent to the second communication endpoint. This allows the second endpoint to display the security classification. A similar process is used in a response to the request to establish the communication session to convey the security classification to the first communication endpoint. This allows both the parties in the communication session to know the current security classification for the communication session.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
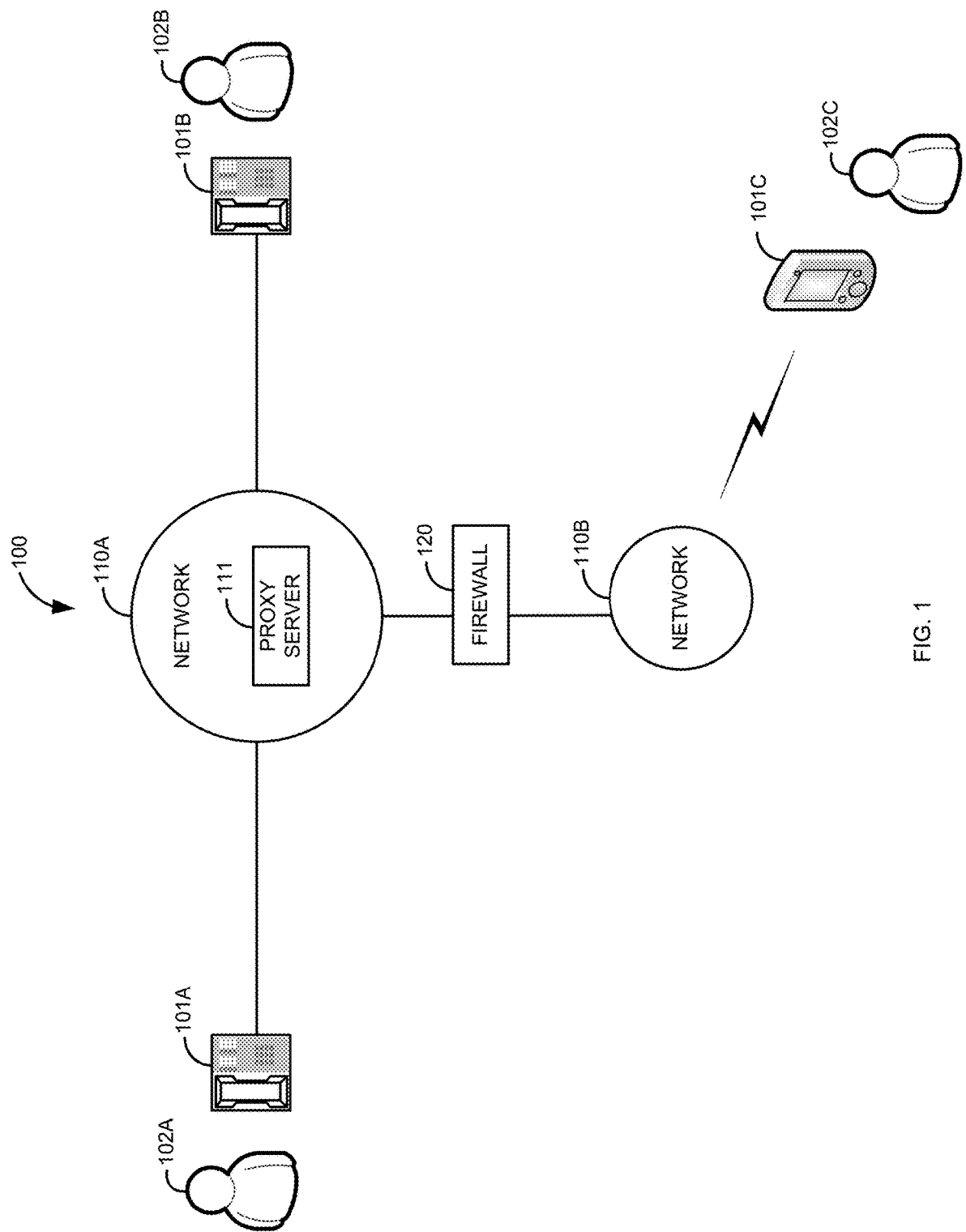
FIG. 1 is a block diagram of a first illustrative system for dynamically classifying a communication session.

FIG. 1 is a block diagram of a first illustrative system 100 for dynamically classifying a communication session. The first illustrative system 100 comprises communication endpoints 101A-101C, networks 110A-110B, a proxy server 111, and a firewall 120.

The communication endpoints 101A-101C can be or may include any endpoint device that can communicate on the network 110, such as a Personal Computer (PC), a telephone, a video system, a cellular telephone, a Personal Digital Assistant (PDA), a tablet device, a notebook device, a smart phone, and/or the like. FIG. 1 also shows users 102A-102C associated with a respective communication endpoint 101A-101C.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, Internet Protocol (IP), Session Initiation Protocol (SIP), Integrated Services Digital Network (ISDN), H.323, WebRTC, video protocols, Instant Messaging (IM) protocols, and/or the like. Thus, the networks 110A-110B are electronic communication networks configured to carry messages via packets and/or circuit switched communications.

In FIG. 1, the network 110A is typically a secure network, such as a corporate or government network. The network 110B is typically an unsecure network, such as the Internet or the PSTN.

The proxy server 111 can be or may include any hardware coupled with software that can provide proxy/routing services for communication sessions, such as a SIP proxy server, a Private Branch Exchange, a central office switch, a communication manager, a session manager, a router, and/or the like. The proxy server 111 may provide security features, such as authentication of users 103A-103C to the network 110A. The proxy server 111 can provide other security features, such as determining if the network 110A is secure, determining if a specific link in the network 110 is secure, determining if a specific dialog (e.g., a SIP dialog) is secure, determining if a specific communication device or communication endpoint 101 is secure, and/or the like. The proxy server 111 can determine different security classifications for communication links, communication devices, communication endpoints 101, networks 110, and/or the like. The security classifications may be defined as unclassified, protected, secret, top secret, and/or the like. The proxy server 111 may receive security classification information or be administered by other communication devices in the network 110, such as a network administration terminal.

The firewall 120 can be or may include any hardware coupled with software that can provide protection services for the network 110A, such as a Network Address Translator (NAT), a Session Boarder Controller (SBC), a packet filter, a port blocking software, a state filtering firewall, an application filter, and/or the like.

Figure 2:
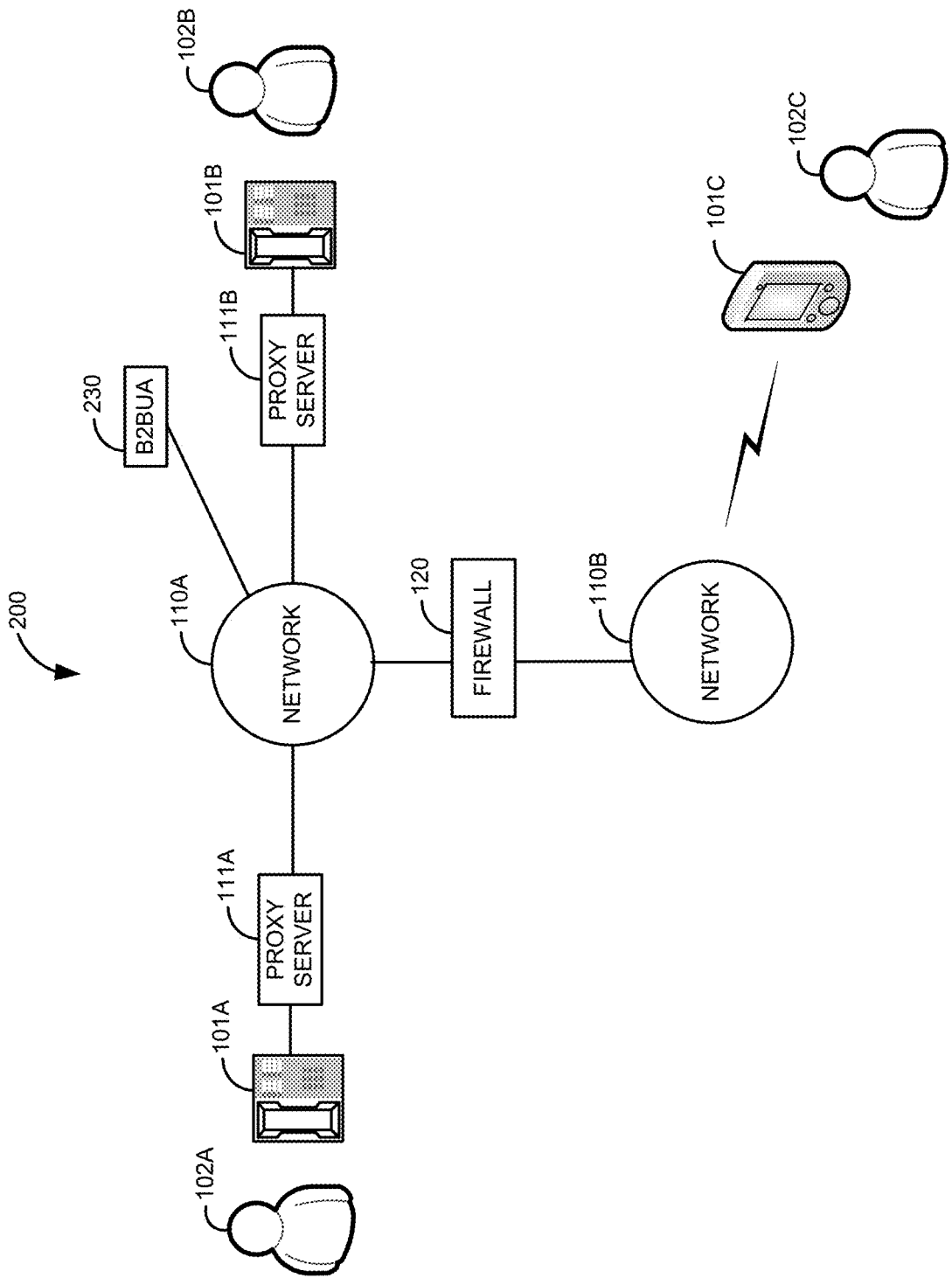
FIG. 2 is a block diagram of a second illustrative system for dynamically classifying a communication session with a Back-to-Back User Agent (B2BUA).

FIG. 2 is a block diagram of a second illustrative system 200 for dynamically classifying a communication session with a Back-to-Back User Agent (B2BUA) 230. The second illustrative system 200 comprises the communication endpoints 101A-101C, the networks 110A-110B, proxy servers 111A-111B, the firewall 120, and the B2BUA 230. In addition, FIG. 2 shows the users 102A-102C associated with the respective communication endpoints 101A-101C.

The B2BUA 230 can be an application or device that can be inserted into a communication session. The B2BUA 230 can be inserted into a signaling channel and/or media channel of a communication session. The communication session may be a real-time communication session, such as a voice, video, or an Instant Messaging (IM) communication session. The B2BUA 230 may be a SIP B2BUA 230 as defined in Network Working Group RFC 3261 "SIP: Session Initiation Protocol" June 2002, which is incorporated herein by reference in its entirety. The B2BUA 230 may support various features, such as call forwarding, call blocking, call screening, call recording, voice recognition, gesture recognition, key work recognition, and/or the like.

Figure 3:
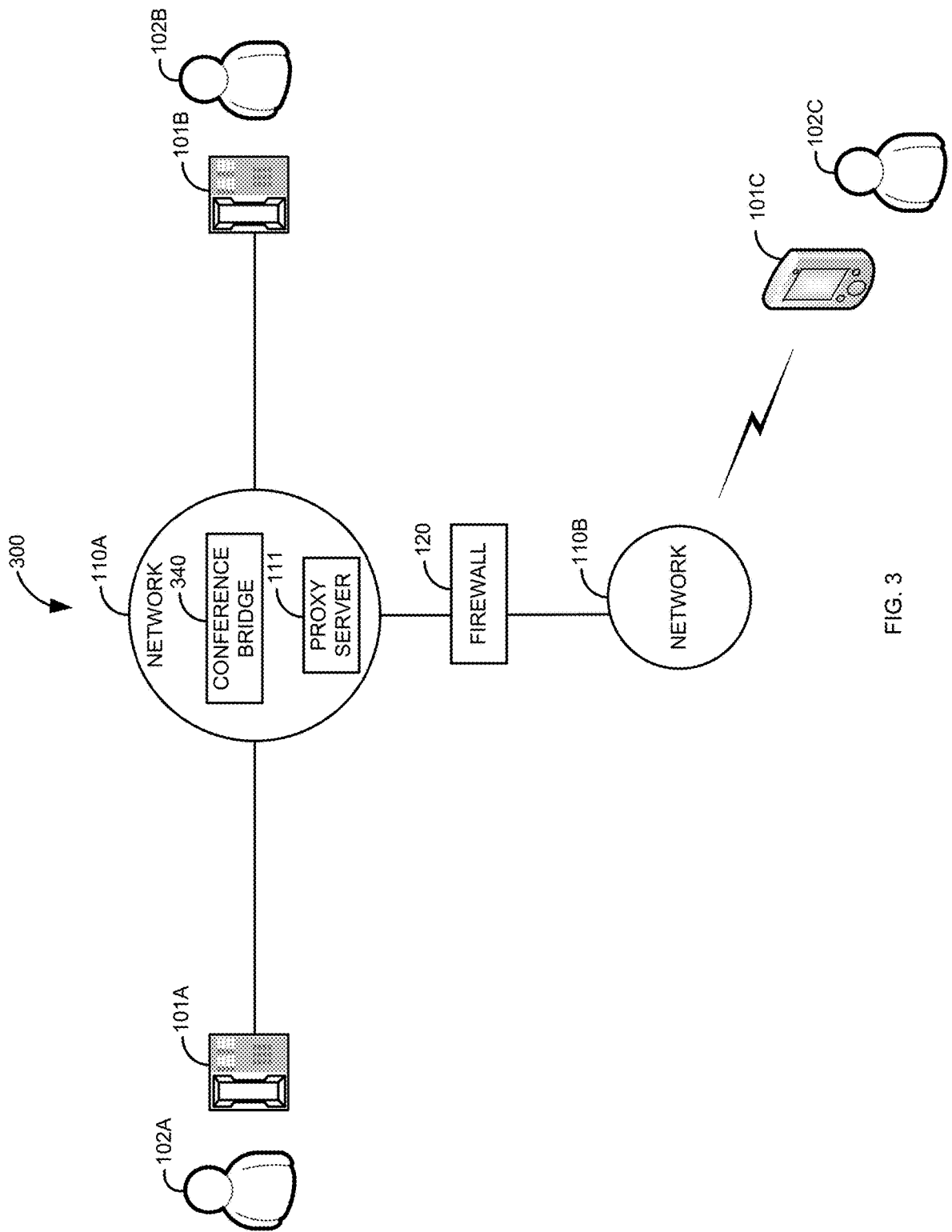
FIG. 3 is a block diagram of a third illustrative system for dynamically classifying a communication session with a conference bridge.

FIG. 3 is a block diagram of a third illustrative system 300 for dynamically classifying a communication session with a conference bridge 340. The third illustrative system 300 comprises the communication endpoints 101A-101C, the networks 110A-110B, the proxy server 111, the firewall 120, and a conference bridge 340. In addition, FIG. 3 also shows the users 102A-102C associated with the respective communication endpoints 101A-101C.

The conference bridge 340 can be or may include any hardware coupled with software that can manage a conference between two or more users 102, such as a mixer, an audio bridge, a video bridge, and IM bridge, and/or the like. The conference may be a voice, a video, or an IM conference.

Figure 4:
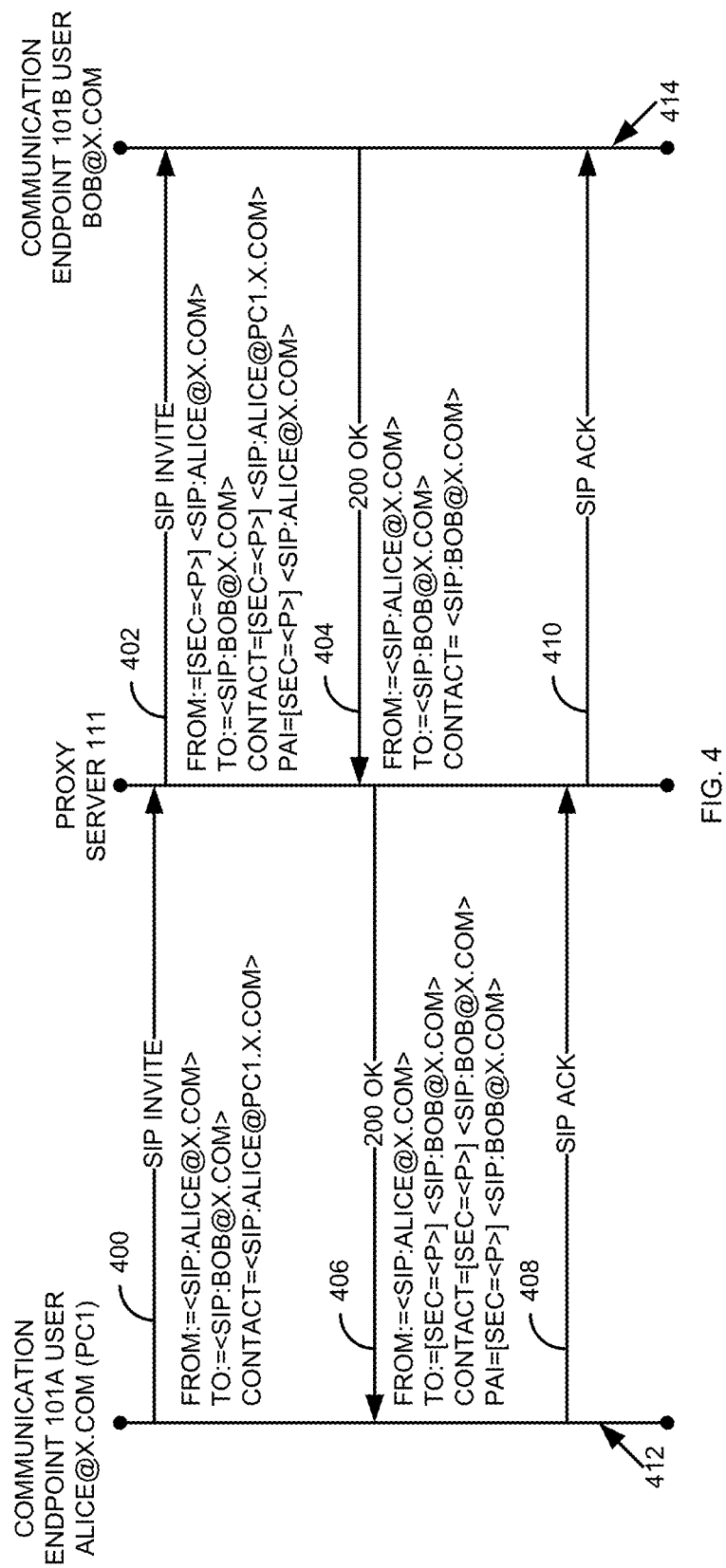
FIG. 4 is a flow diagram of a process for dynamically classifying a communication session.
Figure 5:
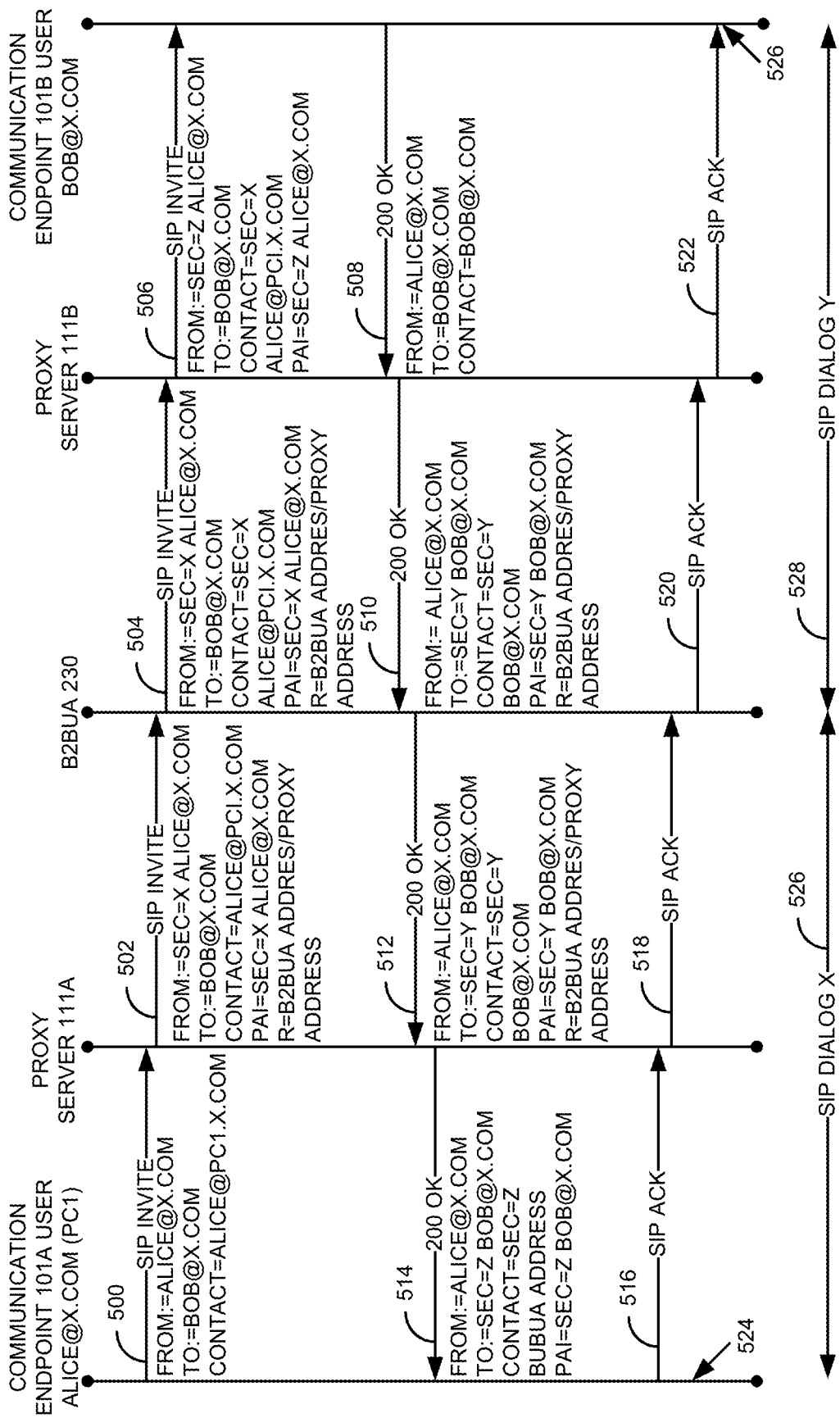
FIG. 5 is a flow diagram of a process for dynamically classifying a communication session with a B2BUA.
Figure 6:
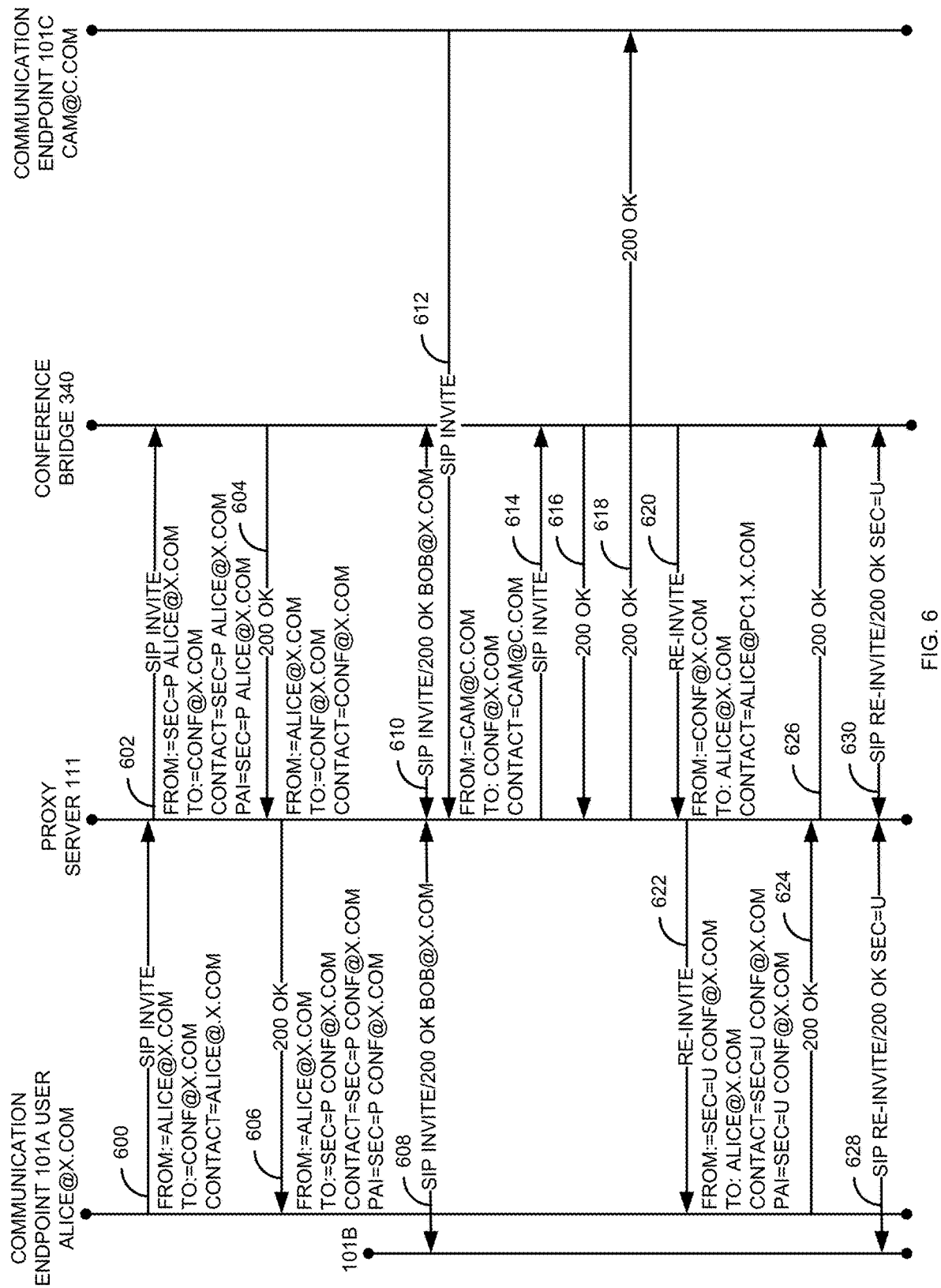
FIG. 6 is a flow diagram of a process for dynamically classifying a communication session with a conference bridge.

FIG. 4 is a flow diagram of a process for dynamically classifying a communication session. Illustratively, the communication endpoints 101A-101C, the networks 110A-110B, the proxy servers 111A-110B, the firewall 120, the B2BUA 230, and the conference bridge 340 are storedprogram-controlled entities, such as a computer or microprocessor, which performs the method of FIGS. 4-6 and the processes described herein by executing program instructions stored in a computer readable storage medium, such as a memory or disk. Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation.

The process of FIG. 4 is based on FIG. 1. The process starts in step 400 when the communication endpoint 101A sends a SIP INVITE message to the communication endpoint 101B. The SIP INVITE message of step 400 has a From: header, a To: header, and a Contact header. The From: header is <sip:Alice@x.com>, the To: header is addressed to <sip:Bob@x.com>, and the Contact header is <sip:Alice@PC1.x.com. The From: header comprises a SIP Uniform Resource Identifier (URI) (Alice@x.com) for the user Alice 102A. The SIP URI is used to identify the user 102A of the communication endpoint 101A (Alice). The To: header comprises a SIP URI (Bob@x.com) for the user 102B of the communication endpoint 101B (Bob). The Contact header uniquely identifies a specific communication device of the user Alice 102A. In this example, the identifier Alice@PC1.x.com uniquely identifies Alice's communication endpoint 101A. Alice may have a second communication endpoint 101 (not shown) that is a cellular telephone identified by Alice@cell1.x.com. This allows Alice to make a call from different communication endpoints 101 and have a response be routed back to the proper communication endpoint 101 of Alice using the Contact header.

The proxy server 111 receives the SIP INVITE message of step 400. The proxy server 111 determines a security classification for the communication session between the first communication endpoint 101A and the second communication endpoint 101B in step 402. The security classification may be defined based on different types of information that may be associated with a communication session. For example, the security classification may be unclassified, protected, secret, top secret, and/or the like. The security classification may be defined based on the network 110, a leg(s) of a call, an IP address, a domain name (e.g., x.com), a specific URI (e.g. Alice@x.com), a location of a communication endpoint 101, a telephone number, a Private Branch Exchange (PBX) handling a call, a location of a network 110, whether a communication endpoint 101 is outside the firewall 120, an assignment by an administrator, which communication endpoints 101 are involved in the communication session, and/or the like.

The security classification(s) are not necessarily based on whether the communication session is solely encrypted. For example, referring to FIG. 1, an unencrypted communication session between the communication endpoints 101A and 101B may be considered top secret while an encrypted communication session between the communication endpoint 101A and the communication endpoint 101C may be considered unclassified because the communication endpoint 101C is outside the firewall 120 (e.g., in a public location).

The security classification may be based on the owner of the communication endpoint(s) 101 or who has authenticated to a particular communication endpoint 101. For example, a communication session between the communication endpoints 101A and 101B may be top secret based on user 102A and 102B being authenticated from each of the communication endpoints 101A-101B. However, if a third user 102D (not shown) was authenticated to the communication endpoint 101B instead of user 102B, the call may have a different security classification, such as protected or secret instead of top secret.

The proxy server 111 sends, in step 402, the SIP INVITE message of step 400 by inserting the determined security classification into one or more of the SIP From: header, the Contact header, the SIP P-Asserted-Identity (PAI) header, and/or a proprietary header. In FIG. 4, the determined security classification is designated as [SEC=<P>], which is short for protected. In FIG. 4, the determined security classification is inserted into the From: header, the Contact Header, and the PAI header. The reason why the security classification is inserted into the From: header, the Contact header, and the PAI header is because different communication endpoints 101 from different vendors may use different ones of the From header, the Contact header, and/or the PAI header when displaying who is on a call. Since the security classification is inserted into each header, the security classification will be displayed regardless of which header is displayed to the user 102B.

The PAI header is defined in Network Working Group SIP RFC 3325 entitled "Private Extensions to the Session Initiation Protocol (SIP) for Asserted Identity within Standard Trusted Networks," November 2002, which is incorporated herein in its entirety by reference. The PAI header identifies a user 102 who has authenticated to the communication endpoint 101. In this case, the user Alice 102A has been authenticated (e.g., using a digital certificate and/or password using a separate authentication process) as shown in the PAI header (<sip:Alice@x.com>) of the SIP INVITE message of step 402. The authentication may be accomplished by the proxy server 111 or another communication device, such as an authentication server (not shown).

The format for the security classification is defined as [SEC=<P>] at the beginning of each header. In this example, P stands for protected. Other values for the security classification may be U for unclassified ([SEC=<U>]), S for secret ([SEC=<S>]), and TS for top secret ([SEC=<TS>]). One of skill in the art would recognize that the format for the security classification may be different based on implementation. For example, the format for the security classification may be defined as [SEC=PROTECTED], SECURITY=PROTECTED, or the security classification may be in a different place in a particular header. The security classification may be in different formats or different locations in different headers in the same message. Although not shown, if the security classification is sent in a proprietary header, the format for the proprietary header may be in the same format or a different format.

The communication endpoint 101B receives the SIP INVITE message of step 402. The communication endpoint 101B stores the security classification that is in the SIP INVITE message of step 402. The communication endpoint 101B responds to the SIP INVITE message of step 402 by sending a SIP 200 OK message in step 404. The SIP 200 OK is sent using standard SIP messaging that has a From: header (<sip:Alice@x.com), a To: header (<sip:Bob@x.com), and a Contact header (<sip:Bob@x.com). In this example, the user Bob 102B only has a single communication endpoint 101B; thus the Contact header is the same as the From: header in the SIP 200 OK message of step 404. Although the contact header is shown as <sip:Bob@x.com>, the contact header is typically sent using an IP address of Bob's communication endpoint 101B.

The proxy server 111 receives the SIP 200 OK message of step 404. The proxy server 111 inserts, in step 406, the security classification into one or more of the To: header, the Contact header, the PAI header, and/or the proprietary header. In this example, the proxy server 111 inserts the security classification into the To: header, the Contact header, and the PAI header. The proxy server 111 sends the SIP 200 OK message of step 406 to the communication endpoint 101A. The communication endpoint 101A stores the security classification.

The communication endpoint 101A responds to the SIP 200 OK message by sending a SIP ACK message in step 408 to the proxy server 111. The proxy server 111 sends the SIP ACK to the communication endpoint 101B in step 410. At this point, the communication session has been established between the communication endpoints 101A and 101B. A media stream (e.g., a video stream) can then be established (e.g., using Real-Time Protocol (RTP) media stream) between the communication endpoint 101A and 101B. The communication endpoint 101A displays, based on one of the From: header, the Contact header, the PAI header, and/or the proprietary header, the security classification to the user 102A in step 412. For example, the communication endpoint 101A may display the From: header on a display of the communication endpoint 101A as [SEC=<P>] Bob@x.com. The communication endpoint 101B displays a similar message [SEC=<P>] Alice@x.com in step 414. This way both the users 102A and 102B know that the security classification for the communication session is protected.

In FIG. 1, step 412 may occur after step 406 when the security classification is first received. Likewise, step 414 may occur after step 402 when the security classification is first received.

A communication session can change dynamically. For example, the user 102A may transfer the communication session from communication endpoint 101A to establish a communication session between the communication endpoint 101B and the communication endpoint 101C. For example, a communication session may be transferred according to Network Working Group RFC 5589 entitled "Session Initiation Protocol (SIP) Call Control—Transfer," June 2009 ("RFC 5589"), which is incorporated herein in its entirety. RFC 5589 describes "blind" transfer in FIG. 1. The process of inserting the security classification into the one or more headers as described above would also work for the "blind" transfer of FIG. 1 of RFC 5589. The proxy server 111 would insert the security classification into the one or more headers when the SIP INVITE message F5 of FIG. 1 of RFC 5589 is sent from the transferee to the transfer target. The proxy server 111 would also insert the security classification into the SIP 200 OK that follows the SIP INVITE message F5 of RFC 5589 in a similar manner as discussed in FIG. 4. In this example, since the communication endpoint 101C is on an unsecure network 110B, the security classification that is inserted would be [SEC=<U>] to indicate that the call is now unclassified. This would allow the communication endpoints 101B and 101C to display the security classification of unclassified.

RFC 5589 also discloses, in FIG. 6 a transfer using a SIP INVITE with replaces header message. The proxy server 111 would insert the security classification into the SIP INVITE with replaces header message/SIP 200 OK of F6 (FIG. 6 of RFC 5589). This would apprise the communication endpoints 101B and 101C that the call is now unclassified.

The above process of inserting the security classification into the SIP INVITE/200 OK messages will also work for other types changes in the call, such as, call forking, call forwarding, media streaming from a server, and/or the like. The above process will work for parallel call forking (where a call is forked to two devices in parallel) or serial call forking (where a call is forked to a different device if not answered).

FIG. 5 is a flow diagram of a process for dynamically classifying a communication session with a B2BUA 230. The process of FIG. 5 is based on FIG. 2. In FIGS. 5 and 6, the nomenclature for the headers in the messages does not include the full SIP nomenclature as shown in FIG. 4. For example, the use of < >, sip: in the headers in FIGS. 5 and 6 are not shown in order to fit the necessary information into FIGS. 5 and 6.

The process starts in step 500 when a SIP INVITE message is sent (similar to step 400 of FIG. 4) by the communication endpoint 101A. The proxy server 111A receives the SIP INVITE message of step 500. The proxy server 111A inserts, in step 502, the security classification into one or more of the From: header, the Contact header, the PAI header, and/or the proprietary header in the SIP INVITE message of step 500. In this example, the security classification is inserted into the From: header, the Contact header, and the PAI header. In FIG. 5, the security classification is designated as X, which represents the security classification for the SIP dialog X (526) between the communication endpoint 101A and the B2BUA 230. The security classification may be any of the possible security classifications (e.g., unclassified, secret, etc.).

In this example, since the communication session has a B2BUA 230 (e.g., based on a user or administrated user 102A preference) that is in the communication session, the proxy server 111A adds a route header (R=B2BUA ADDRESS/PROXY ADDRESS) that has the address of the B2BUA and the address of the proxy server 111A. The SIP INVITE message of step 502 is then sent to the B2BUA 230 based on the route header.

The B2BUA 230 receives the SIP INVITE message of step 502. The B2BUA 230 sends the SIP INVITE of step 504 to the proxy 111B.

The proxy server 111B receives the SIP INVITE message of step 504. The proxy server 111B determines an overall security classification Z for the communication session between the communication endpoint 101A and the communication endpoint 101B. The overall security classification Z is based on the security classification of the SIP dialog X 526 (from the SEC=X security classification in the SIP INVITE of step 504) and the security classification of the SIP dialog Y (528). The overall security classification is based on the lowest security classification of the SIP dialog X (526) and the SIP dialog Y (528). For example, if the security classification for the SIP dialog X (526) is top secret and the security classification for the SIP dialog Y (528) is protected, the overall security classification Z will be protected, which is the lowest security classification of protected and top secret. If the security classification of the SIP dialog X (526) and the security classification of the SIP dialog Y (528) are the same, then the overall security classification will bet the same as the SIP dialog X (526) and the SIP dialog Y (528). The proxy server 111B inserts the overall security classification Z into the SIP INVITE message of step 504 and sends the updated SIP INVITE message to the communication endpoint 101B in step 506. The communication endpoint 101B stores the overall security classification Z.

The communication endpoint 101B responds by sending a SIP 200 OK message in step 508. The SIP 200 OK message of step 508 has a To: header of Bob@x.com, a From: header of Alice@x.com, and a contact address of Bob@x.com. The proxy server 111B receives the SIP 200 OK message of step 508. The proxy server 111B inserts the security classification for the SIP dialog Y (528) into one or more of the To: header, the Contact header, the PAI header, or the proprietary header in step 510. In this example, the proxy server 111B inserts the security classification for the SIP dialog Y (528) into the To: header, the Contact header, and the PAI header. The PAI header in the SIP 200 OK message of step 510 indicates that Bob@x.com has been authenticated. The proxy server 111B also inserts the route header with the address of the B2BUA and the address of the proxy server 111B in step 510.

The B2BUA 230 receives the SIP 200 OK message of step 510. The B2BUA 230 sends the SIP 200 OK message in step 512 to the proxy server 111A. The proxy server 111A receives the SIP 200 OK message of step 512. The proxy server 111A determines an overall security classification Z (i.e., similar to the proxy server 111B as described earlier in step 506). The overall security classification Z is based on the security classification of the SIP dialog Y (528) and the SIP dialog X (526). The proxy server 111A inserts the overall security classification Z into one or more of the To: header, the Contact header, the PAI header, and/or the proprietary header. In this example, the proxy server 110A inserts the overall security classification Z into the To: header, the Contact header, and the PAI header. The proxy server 111A sends the SIP 200 OK with the overall security classification Z in step 514. The communication endpoint 101A receives the SIP 200 OK message of step 514. The communication endpoint 101A stores the overall security classification Z.

The communication endpoint 101A sends a SIP ACK message to the proxy server 111A in step 516. The proxy server 111A sends the SIP ACK message to the B2BUA 230 in step 518. The B2BUA 230 sends the SIP ACK message to the proxy server 111B in step 520. The proxy server 111B sends the SIP ACK message to the communication endpoint 101B in step 522. At this point, a communication session has been established between the communication endpoint 101A and the communication endpoint 101B.

The communication endpoint 101A displays the overall security classification to the user 102A (Alice) in step 524. The communication endpoint 101B displays the overall security classification Z to the user 102B (Bob) in step 526. The process of step 524 and 526 may occur at any point after the security classification is received by the respective communication endpoint 101A-101B.

In an alternate embodiment, the proxy server 111B, instead of inserting the SEC=Y security classification into the 200 OK message of step 508, will insert the SEC=Z security classification into the 200 OK message of step 508. In this case, the proxy server 111A will not change the SEC=Y security classification in the 200 OK message of step 512.

The process of FIG. 5 may also work where there are multiple B2BUAs 230. For example, if there are two B2BUAs 230 between the proxy server 111A and the Proxy server 111B. In this case, the security classification in the headers would be copied by the B2BUAs 230 as the various messages progresses between the B2BUAs 230. If one of the B2BUAs 230 adds an additional party to the call, the B2BUA 230 would have to propagate the lowest common security classification in the proxy servers 111A/111B similar to the process described in FIG. 6 below.

In an alternate embodiment, each B2BUA 230 may copy the security classification using different mechanisms, such as using SIP via headers. In this case, the proxy server (e.g., the proxy server 111B) for the SIP INVITE of step 504 would make a determination of the security classification by analyzing the entire path traversed from the communication endpoint 101A, proxy server 111A, and the B2BUAs 230. The process of a B2BUA 230 using SIP via headers is also described in RFC 3261.

FIG. 6 is a flow diagram of a process for dynamically classifying a communication session with a conference bridge 340. The process of FIG. 6 is based on FIG. 3. The process of FIG. 6 does not shown any SIP ACK messages as previously done in FIGS. 4 and 5 in order to show the overall process of FIG. 6. One of skill in the art would recognize that sending a SIP ACK message in response is well known and could easily modify FIG. 6 to include the necessary SIP ACK messages.

The process starts in step 600 when the communication endpoint 101A sends a SIP INVITE message to establish a communication session with a conference bridge 340. In this example, the conference bridge 340 has an address of conf@x.com. The proxy server 111 receives the SIP INVITE message of step 600.

The proxy server 111 inserts the security classification (SEC=P) into one or more of the From: header, the Contact header, the PAI header, and/or the proprietary header in step 602. In this example, the proxy server 111 inserts security classification SEC=P into the From: header, the Contact header, and the PAI header in step 602. The conference bridge 340 receives the SIP INVITE message of step 602. The conference bridge 340 stores off the security classification (SEC=P) in the SIP INVITE message of step 602.

The conference bridge 340 responds by sending a SIP 200 OK message in standard SIP fashion in step 604. The proxy server 111 inserts the security classification (SEC=P) into one or more of the To: header, the Contact header, the PAI header, and/or the proprietary header in step 606. In this example, the proxy server 111 inserts security classification SEC=P into the To: header, the Contact header, and the PAI header in step 606. The proxy server 111 sends the SIP 200 OK message of step 606 to the communication endpoint 101A. The communication endpoint 101A can then display the security classification (SEC=P) for the existing communication session with the conference bridge 340, which only has one communication endpoint 101A.

A caller from the communication device 101B also makes a similar call into the conference bridge 340 in steps 608 and 610 (i.e., replicating steps 600, 602, 604, and 606 for the communication endpoint 101B). The process of steps 608 and 610 allow the conference bridge 340 to get the security classification (SEC=P in this example) for the communication session from the communication endpoint 101B. In this case, the proxy server 111 also knows the security classification of the two communication sessions (from the communication endpoint 101A and the communication endpoint 101B). The communication endpoint 101B will also display a security classification of SEC=P because the two communication sessions are protected and the overall communication security classification is protected.

The user 102C (Cam, who is outside the network 110A) at the communication endpoint 101C calls into the conference bridge 340. This results in the SIP INVITE message of step 612 being sent to the proxy server 111 via the firewall 120. In this example, since SIP INVITE message of step 612 is from a communication endpoint 101C that is outside the network 110A, the proxy server 111 does not insert the security classification into the SIP INVITE message that is sent to the conference server 340 in step 614. Alternatively the proxy server 111 could insert a security classification of SEC=U into one or more of the From: header, the Contact header, the PAI header and/or the proprietary header in the SIP IVNITE message of step 614 as described previously. In either case, the proxy server 111 and the conference bridge 340 both know that the communication session with the communication endpoint 101C has a security classification of unclassified. The conference bridge 340 sends a SIP 200 OK to the communication endpoint 101C via the proxy server 111/firewall 120 in steps 616 and 618.

In response to receiving the SIP INVITE message of step 614 (with our without a security classification), the conference bridge 340 sends in a SIP Re-INVITE message to the proxy server 111 in step 620. This is because the security classification is changed (different) and the SIP Re-INVITE message is used to update the security classification. The proxy server 111 inserts the security classification (SEC=U because the conference call now unclassified) into one of the From: header, the Contact header, the PAI header, and/or the proprietary header in step 622. In this example, the proxy server 111 inserts security classification SEC=U into the From: header, the Contact header, and the PAI header into the SIP Re-INVITE message of step 622. The communication endpoint 101A responds by sends a SIP 200 OK message to the proxy server 111 in step 624. The proxy server 111 sends the SIP 200 OK to the conference bridge 340 in step 626. At this point, the communication endpoint 101A can display the security classification of the conference call with a security classification of unclassified (SEC=U).

The process of steps 620, 622, 624, and 626 are repeated in a similar manner for the communication endpoint 101B in steps 628 and 630. This allows the communication endpoint 101B to also display the security classification of unclassified (SEC=U).

One of skill in the art would recognize that the order of which communication endpoint 101-101C access the conference bridge 340 may be in different orders. For example, the communication endpoint 101C may access the conference bridge 340 before the communication endpoint 101B. In this example, there would only be in SIP Re-INVITE message sent to the communication endpoint 101A. The security classification for each communication endpoint may be different. When there is a difference in the security classification, the SIP Re-INVITE message will be sent when the security classification needs to be lowered.

In one embodiment, instead of sending a SIP Re-INVITE message, the conference bridge 340 can send a SIP UPDATE message in steps 620, 622, 628, and 630. Alternatively, a SIP PUBLISH or SIP NOTIFY message may also be used.

The processes described in FIGS. 1-6 are described using SIP. However, one of skill in the art would recognize that the processes of FIGS. 1-6 may be implemented using other protocols, such as H.323, WebRTC, video protocols, IM protocols, and/or the like.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
receive, from a first communication endpoint, a Session Initiation Protocol (SIP) INVITE message to establish a communication session between the first communication endpoint and a second communication endpoint,
determine a first security classification of a plurality of possible security classifications for the communication session, wherein the first security classification is not based on whether the communication session is solely encrypted,
insert the first security classification into the SIP INVITE message, and
send the SIP INVITE message with the first security classification to the second communication endpoint.

2. The system of claim 1, wherein first security classification is inserted into one of a SIP From: header, a SIP Contact header, a SIP P-Asserted-Identity header, or a proprietary header in the SIP INVITE message.

3. The system of claim 2, wherein the first security classification is inserted into the SIP From: header, the SIP Contact header, and the SIP P-Asserted-Identity header in the SIP INVITE message.

4. The system of claim 2, wherein the microprocessor receives a SIP 200 OK message from the second communication endpoint, inserts the first security classification into one of the SIP To: header, the SIP Contact header, the SIP P-Asserted-Identity header, or the proprietary header in the SIP 200 OK message, and sends the SIP 200 OK message with the first security classification to the first communication endpoint.

5. The system of claim 4, wherein the first security classification is inserted into the SIP To: header, the SIP Contact header, and the SIP P-Asserted-Identity header in the SIP 200 OK message.

6. The system of claim 2, wherein the microprocessor receives a SIP 200 OK message from a Back-to-Back User Agent (B2BUA), wherein the SIP 200 OK message comprises a second security classification for a SIP dialog between the B2BUA and the second communication endpoint in one of the SIP To: header, the SIP Contact header, the SIP P-Asserted-Identity header, or the proprietary header, determines an overall security classification based on the first security classification and the second security classification, and sends the SIP 200 OK message with the overall security classification to the first communication endpoint.

7. The system of claim 6, wherein the overall security classification is sent in the SIP To: header, the SIP Contact header, and the SIP P-Asserted-Identity header in the sent SIP 200 OK message.

8. The system of claim 2, wherein the communication session between the first communication endpoint and the second communication endpoint is transferred from the first communication endpoint to a third communication endpoint to establish a communication session between the second communication endpoint and the third communication endpoint, wherein the microprocessor receives a second SIP INVITE message or a SIP INVITE with replaces header message and inserts a second security classification into one of the SIP From: header, the SIP Contact header, the SIP P-Asserted-Identity header, or the proprietary header in the second SIP INVITE message or the SIP INVITE with replaces header message.

9. The system of claim 2, wherein microprocessor receives a SIP 200 OK message from a Back-to-Back User Agent (B2BUA), wherein the SIP 200 OK message comprises a second security classification for a SIP dialog between the B2BUA and the second communication endpoint in a SIP via header.

10. The system of claim 2, wherein the microprocessor receives a SIP 200 OK message from a Back-to-Back User Agent (B2BUA), wherein the SIP 200 OK message comprises an overall security classification inserted by a proxy server into the SIP 200 OK message.

11. A method comprising:
receiving, by a microprocessor, from a first communication endpoint, a Session Initiation Protocol (SIP) INVITE message to establish a communication session between the first communication endpoint and a second communication endpoint;
determining, by the microprocessor, a first security classification of a plurality of possible security classifications for the communication session, wherein the first security classification is not based on whether the communication session is solely encrypted;
inserting, by the microprocessor, the first security classification into the SIP INVITE message; and
sending, by the microprocessor, the SIP INVITE message with the first security classification to the second communication endpoint.

12. The method of claim 11, wherein the first security classification is inserted into one of a SIP From: header, a SIP Contact header, a SIP P-Asserted-Identity header, or a proprietary header in the SIP INVITE message.

13. The method of claim 12, wherein the first security classification is inserted into the SIP From: header, the SIP Contact header, and the SIP P-Asserted-Identity header in the SIP INVITE message.

14. The method of claim 12, further comprising:
receiving, by the microprocessor, a SIP 200 OK message from the second communication endpoint;
inserting, by the microprocessor, the first security classification into one of the SIP To: header, the SIP Contact header, the SIP P-Asserted-Identity header, or the proprietary header in the SIP 200 OK message; and
sending, by the microprocessor, the SIP 200 OK message with the first security classification to the first communication endpoint.

15. The method of claim 14, wherein the first security classification is inserted into the SIP To: header, the SIP Contact header, and the SIP P-Asserted-Identity header in the SIP 200 OK message.

16. The method of claim 12, further comprising:
receiving, by the microprocessor, a SIP 200 OK message from a Back-to-Back User Agent (B2BUA), wherein the SIP 200 OK message comprises a second security classification for a SIP dialog between the B2BUA and the second communication endpoint in one of the SIP To: header, the SIP Contact header, the SIP P-Asserted-Identity header, or the proprietary header;
determining, by the microprocessor, an overall security classification based on the first security classification and the second security classification; and
sending, by the microprocessor, the SIP 200 OK message with the overall security classification to the first communication endpoint.

17. A system comprising:
a microprocessor; and
a computer readable medium coupled with the microprocessor and comprising microprocessor readable and executable instructions that program the microprocessor to execute a conference bridge, wherein the conference bridge:
receives a first Session Initiation Protocol (SIP) INVITE message from a first communication endpoint, wherein the first SIP INVITE message comprises a first security classification,
receives a second SIP INVITE message from a second communication endpoint, wherein the second SIP INVITE message comprises a second security classification,
determines an overall security classification for a conferenced communication session based on the first security classification being different from the second security classification, and
in response to the first security classification being different from the second security classification, sends a first SIP Re-INVITE message to the first communication endpoint, wherein the first SIP Re-INVITE message comprises the overall security classification.

18. The system of claim 17, wherein the overall security classification is not unclassified, wherein the conference bridge receives a third SIP INVITE message that does not comprise a security classification and, in response to receiving the third SIP INVITE message that does not comprise the security classification, sends a second SIP Re-INVITE message to the first communication endpoint, wherein the second SIP Re-INVITE message comprises a security classification of unclassified, and sends a third SIP Re-INVITE message to the second communication endpoint, wherein the third SIP Re-INVITE message comprises the security classification of unclassified.

19. The system of claim 17, wherein the first security classification is in one of a SIP From: header, a SIP Contact header, a SIP P-Asserted-Identity header, or a proprietary header of the SIP INVITE message.

20. The system of claim 17, wherein the conference bridge sends a SIP UPDATE message to the first communication endpoint, wherein the SIP UPDATE message comprises the overall security classification.

* * * * *